United States Patent [19]
Reid et al.

[11] 3,866,771
[45] Feb. 18, 1975

[54] VEHICLE LOADING RAMP DISPLACEMENT APPARATUS

[75] Inventors: Lloyd W. Reid; Billy D. Rayle, both of Greensboro; Harold C. Flinchum, Liberty, all of N.C.

[73] Assignee: Reid's Trailer Inc., Pleasant Garden, N.C.

[22] Filed: Apr. 16, 1973

[21] Appl. No.: 351,543

[52] U.S. Cl. .......................... 214/85, 296/61, 14/71
[51] Int. Cl. ............................................. B65g 67/02
[58] Field of Search .................. 214/85, 85.1, 85.5; 296/61; 14/71, 72

[56] References Cited
UNITED STATES PATENTS

| | | |
|---|---|---|
| 2,309,198 | 1/1943 | McCleneghan ...................... 214/85 |
| 2,718,431 | 9/1955 | Pietroroia ......................... 214/85 X |
| 2,721,758 | 10/1955 | Allen ..................................... 296/61 |
| 3,516,560 | 6/1970 | Brighton ............................... 214/85 |

*Primary Examiner*—Albert J. Makay

[57] ABSTRACT

Apparatus for facilitating the displacement of loading ramps pivotably mounted upon a vehicle includes an electrically operated winch mechanism connected to a boom, the boom being pivotably mounted upon the vehicle and attached to the loading ramps through flexible connectors.

5 Claims, 3 Drawing Figures

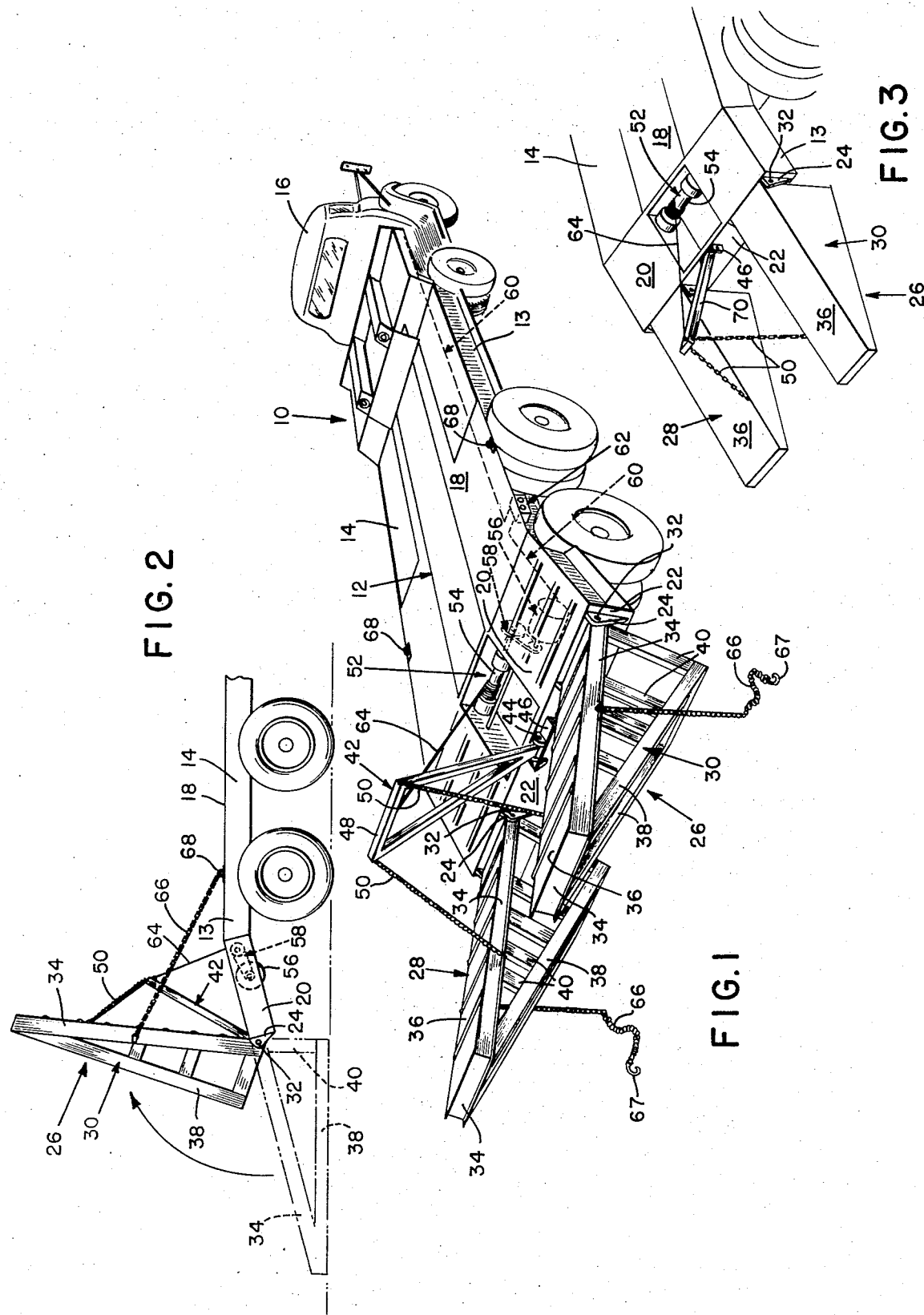

3,866,771

VEHICLE LOADING RAMP DISPLACEMENT APPARATUS

BRIEF SUMMARY AND OBJECTS OF THE INVENTION

This invention relates generally to vehicles such as trucks and trailers having displaceable loading ramps located at the rearward end portions, and more particularly to an assembly for moving the loading ramps between a loading or unloading position wherein the ramps engage the ground in a raised position for movement of the vehicle.

Briefly, the assembly includes a boom structure pivotably mounted at the rear of the vehicle intermediate the spaced loading ramps and connected to the ramps by chains or other suitable members. An electrically operated winch has the cable thereof secured to the boom for lifting and lowering the boom and ramps. The electrically operated winch receives a source of power from the vehicle electrical system and is controlled from a position adjacent the ramps. The winch is secured to the vehicle frame adjacent the boom.

One of the primary objects of the invention is the provision of a new and improved mechanism for displacing the loading ramp means of a vehicle between operative and inoperative positions.

Another object of the invention is to simplify the power displacement of vehicle loading ramps utilizing the vehicle electrical system as a source of power.

A further object of the invention is the provision of an assembly for displacing the ramps in a rapid and efficient manner.

Other objects and advantages of the invention will become apparent when considered in view of the following detailed description.

BRIEF DESCRIPTION OF THE DRAWING

FIG. 1 is a perspective view of a vehicle having ramps pivoted thereto and provided with applicant's assembly including an electrically operated winch and boom for positioning the ramps at lowered or raised positions;

FIG. 2 is a fragmentary, schematic, side elevational view of the rear portion of the vehicle illustrating the ramps in the raised position and maintained by the winch and safety chains; and FIG. 3 is a perspective, schematic, fragmentary view of the rear portion of the vehicle of FIGS. 1 and 2 and illustrating the winch and a modified boom arrangement.

DETAILED DESCRIPTION OF THE DISCLOSURE

Referring to the drawing, FIG. 1 illustrates a vehicle 10 having an elongated cargo deck or bed portion 12 supported by a frame or chassis 13. In the embodiment illustrated, the vehicle comprises a trailer 14 connected to a cab or tractor 16. The cargo deck and chassis or frame includes a relatively flat, horizontally disposed first section 18 and a second, rearward section 20 angled downwardly from the first section 18. The second section 20 serves as a cargo support surface during transport of the vehicle and also as a ramp portion for facilitating loading and unloading of the cargo.

Pivotably connected to the frame member 22 of the second section 20, by means of spaced brackets 24, is a loading ramp assembly 26. The loading ramp assembly, in the preferred embodiment, includes a pair of spaced ramps 28, 30. The ramps 28, 30 are pivotably mounted upon pins 32 which are attached to brackets 24. Each of the ramps 28 and 30 consist of frame members assembled in a generally trangular configuration. The upper or forward frame members 34 support a metal plate or decking 36 which, when the ramp is in the lowered, loading or the unloading position, extends from the ground or other support surface to a location adjacent the frame member 22 of the second section 20 at substantially the same slope as that of the second section 20. The lower or rearward frame members 38, which engage the ground, and the members 40 provide support for the deck 36 and members 34.

Mounted upon the vehicle 10 and preferably intermediate the ramps 28 and 30 is a boom 42. The boom 42 is pivotably mounted upon the frame 13, and preferably upon the rearwardmost frame member 22 by means of a pivot pin 44 and bracket 46. In the embodiment of FIGS. 1 and 2, the boom 42 is generally triangular shaped with the side 48 of the boom remote to the pivot of the boom being generally horizontally disposed. Secured at opposite ends of the horizontally disposed member 48 are chains 50, or other suitable members, one chain 50 being connected to each of the ramps 28, 30 at a location from the ramp pivot pins 32 approximately three-fourths of the length of the ramp members 28 and 30.

A winch mechanism 52 is attached to the frame 13 adjacent the rear of the bed portion 12. Preferably the winch mechanism 52 is secured to the frame in a manner such that it is recessed below the deck 12 of the second section 20. The mechanism 52 comprises a rotatably mounted drum 54 which is driven by a direct current motor 56 through suitable connections 58. The electrical motor 56 is connected to the electrical system of the vehicle 10. In the embodiment of FIG. 1, the connection is made through the electrical cable 60 which extends from the motor 56 to the 12 volt electrical system of the tractor 16. The motor is actuated by control means 62 supported by the vehicle frame adjacent the winch assembly 52. A cable, chain or the like 64 is wound upon the drum 54 and has the outer end attached by suitable means, not shown, to the horizontally disposed member 48 of the boom 42. The winch mechanism 52 may be provided with a suitable brake and may be of the DC-200-R type manufactured by Ramsey Winch Company of Tulsa, Oklahoma.

Safety chains 66, each having one end connected to the ramp 28 or 30, has a hook 67 on the opposite end adapted to be releasably secured to a suitable fastener 68 positioned upon the vehicle forwardly of the pivotable ramps.

In the embodiment of FIG. 3, the boom consists of a single lever 70 having the chains 50 as well as the cable 64 attached to the outer end thereof with the opposite end being pivotably mounted upon the frame member 22.

The ramps are maintained in the FIG. 2 position by means of cable 64, chains 50, chains 66, and the fact that the deck portion 36 of the ramps abut the frame end member 22 since the ramp pivot points are located below the top of the member 22.

Utilization of an electrical winch assembly and boom for displacing the ramps, rather than by rather expensive, complicated hydraulic means, requires less maintenance, is less expensive and is more versatile since the winch assembly can be used other than for displacing the winch.

We claim:

1. A vehicle having an elongated frame, a deck upon said frame defining a cargo supporting area, loading ramp means including a pair of spaced ramps at one end of said frame, means pivotably mounting said loading ramp means upon said frame for movement between a first, lowered position for facilitating loading and unloading of cargo, and a second, raised position during travel of the vehicle, a boom pivotably connected to said frame between said spaced ramps and flexible means interconnecting each of said spaced ramps to said boom, and power means including a winch recessed within said frame between said spaced ramps and having an elongated flexible member attached thereto and to the free end of said boom for pivoting said ramp means relative to said frame.

2. A vehicle as recited in claim 1, wherein said boom is generally in the form of an isosceles triangle with the portions of the triangle opposite the pivot being generally horizontally disposed.

3. A vehicle as recited in claim 1, wherein said boom comprises a single, elongated lever having one end pivotably mounted to said frame.

4. A vehicle as recited in claim 1, wherein said winch means includes an electric motor connected to the vehicle electrical system, said power means further including motor control means mounted upon said vehicle frame adjacent said ramp means.

5. A vehicle as recited in claim 1, and further including means for securing said ramp means in the second, raised position during travel of the vehicle.

* * * * *